(No Model.)

C. H. PORTER.
ORANGE PEELER.

No. 379,328. Patented Mar. 13, 1888.

Witnesses:
O. H. Taylor.
Walter E. Lombard.

Inventor:
Cyrus Herbert Porter,
by N. C. Lombard
Attorney.

UNITED STATES PATENT OFFICE.

CYRUS HERBERT PORTER, OF BROCKTON, MASSACHUSETTS.

ORANGE-PEELER.

SPECIFICATION forming part of Letters Patent No. 379,328, dated March 13, 1888.

Application filed March 28, 1887. Serial No. 232,705. (No model.)

*To all whom it may concern:*

Be it known that I, CYRUS HERBERT PORTER, of Brockton, in the county of Plymouth and State of Massachusetts, have invented a new and useful Implement for Peeling Oranges, of which the following, taken in connection with the accompanying drawings, is a specification.

The object of my invention is the production of a tool or implement by the use of which oranges may be peeled or have their skins removed without breaking the inner skin and liberating the juice, and with much less soiling of the hands than when using a common knife and the fingers; and it consists in an implement having certain novel and peculiar features of construction, whereby it is particularly adapted to the use for which it is designed, which features will be readily understood by reference to the description of the drawings, and to the claims to be hereinafter given.

Figure 1:
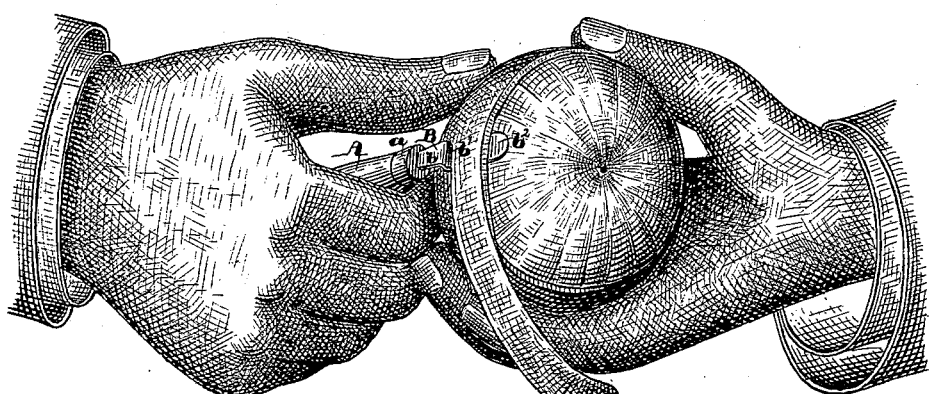
Figure 2:
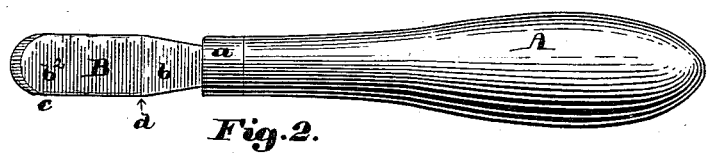
Figure 3:
Figure 5:
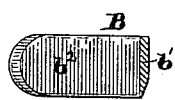
Figure 6:
Figure 4:
Figure 7:
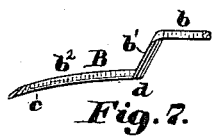

Figure 1 of the drawings is a view illustrating the manner of using my orange-peeling implement. Fig. 2 is a plan of the implement. Fig. 3 is an elevation of the same. Fig. 4 is a transverse section through the blade on line $x$ $x$ on Fig. 3, and showing the handle in end elevation. Fig. 5 is a section through the blade on line $y$ $y$ on Fig. 3, and showing the outer portion of the blade in plan. Fig. 6 is a similar section of a modified form of tool having two cutting-edges to adapt the tool to be used by either a right-handed or a left-handed person. Fig. 7 is an elevation of a portion of a blade, illustrating a slight modification in its shape.

In the drawings, A is the handle of the implement, which may be of wood or any other suitable material, and provided with the ferrule $a$, as shown; or it may be made of metal in one piece with the blade B and of any desired shape.

The blade B is made, preferably, of steel and electroplated, and is composed of the shank $b$, the rind-cutting portion $b'$ at right angles, or nearly so, to the shank, and having a cutting knife-edge upon one or both edges, and the rind-separating portion $b^2$, curved, as shown, and having its end rounded and beveled to reduce its thickness, but not brought to a cutting-edge. The side edges of the part $b^2$ are rounded from $c$ to $d$, so that it cannot cut the inner skin of the orange when introduced between the peeling and the inner skin.

To peel an orange with my implement, the peel is pierced near the blossom end of the orange by inserting the rounded end of the blade between the peel and inner skin until the part $b^2$ is all beneath the peel, when the orange is revolved in the fingers till the peel is entirely removed in the form of a ribbon or narrow band, the cutting-edge of the rind-cutting portion $b'$ making a clean cut through the peel radial, or nearly so, to the center of the orange and extending around the same in the form of a helix, and the rounded edge $c$ to $d$ separating the peel from the inner skin without cutting said inner skin, so as to liberate the juice of the orange.

The operation of peeling is clearly illustrated in Fig. 1.

An implement made in the form shown in Fig. 7 will operate precisely as above described, except that the cut through the peel will be somewhat inclined to a radial line.

I do not wish to be confined to any particular angular position of the cutting-section of the blade relative to the other portions of said blade; but

What I claim as new, and desire to secure by Letters Patent of the United States, is—

1. A blade for an orange-peeling knife, comprising a shank and a rind-separating portion in different planes, the latter having a dull non-cutting edge, and a rind-cutting portion connecting the shank and rind-separating portion at angles thereto, substantially as described.

2. An implement for peeling oranges, provided with a blade having the shank $b$ and section $b^2$, occupying different planes, and the section $b'$, connecting said shank and section $b^2$ and having a cutting-edge, the section $b^2$ having its end reduced to a thin but dull edge and the edge between said end and the section $b'$ simply rounded, as set forth.

In testimony whereof I have signed my name to this specification, in the presence of two subscribing witnesses, on this 26th day of March, A. D. 1887.

C. HERBERT PORTER.

Witnesses:
N. C. LOMBARD,
WALTER E. LOMBARD.